United States Patent Office 3,850,960
Patented Nov. 26, 1974

3,850,960
DERIVATIVES OF α-CYANACRYLIC ACID
Lajos Avar, Binningen, Basel-Land, and Kurt Hofer, Munchenstein, Basel-Land, Switzerland, assignors to Sandoz Ltd., Basel, Switzerland
No Drawing. Filed May 4, 1971, Ser. No. 140,267
Int. Cl. C07d 5/44, 63/24
U.S. Cl. 260—329.3
9 Claims

ABSTRACT OF THE DISCLOSURE

The purpose of this invention is to render accessible new compounds containing one or two cyanacrylic acid radicals, which absorb ultra-violet rays and protect light-sensitive organic materials, notably plastics, from the detrimental action of this radiation.

---

The purpose of this invention is to render accessible new compounds containing one or two cyanacrylic acid radicals, which absorb ultra-violet rays and protect light-sensitive organic materials, notably plastics, from the detrimental action of this radiation.

The invention thus relates to a process for the production of new α-cyanacrylic acid compounds of formula $$\left(Y-\underset{\underset{CN}{|}}{C}=\underset{\underset{R_2}{|}}{C}\right)_{m-1} Q-\underset{\underset{R_1}{|}}{C}=\underset{\underset{CN}{|}}{C}-Y \quad (I)$$

where

Q stands for the diphenyl sulphide, diphenylene sulphide or diphenylene oxide radical which, when $m$ represents the number 1, may be substituted not more than twice by halogen atoms and/or alkyl or alkoxy radicals.

$R_1$ and $R_2$, independently of each other, stand for alkyl or alkenyl radicals, Y for —CN, —COOZ$_1$ or

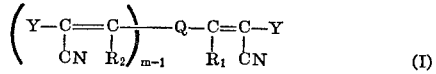

$Z_1$ for an alkyl, cycloalkyl or aryl radicals which may be substituted, $Z_2$ and $Z_3$ conjointly and together with the N atom stand for a heterocyclic ring or independently of each other stand for hydrogen or one of the radicals named in the definition of $Z_1$, and $m$ for the number 1 or 2.

This process is characterized by the condensation of 1 mole of a compound of formula $$\left(O=\underset{\underset{R_2}{|}}{C}\right)_{m-1} Q-\underset{\underset{R_1}{|}}{C}=O \quad (II)$$

with $m$ moles of a compound of formula $$\underset{\underset{CN}{|}}{CH_2-Y} \quad (III)$$

with cleavage of water.

Examples of Q are the radicals of diphenyl sulphide, diphenylene sulphide (dibenzothiophene) and diphenylene oxide (dibenzofuran), which are unsubstituted when $m$ represents the number 2 and otherwise may be substituted once or twice in a benzene ring, examples of suitable substituents being methyl, ethyl, iso-propyl, butyl, iso-butyl, tert. butyl, amyl, 2,2-dimethylpropyl, octyl, dodecyl, 1,1, 3,3-tetramethylbutyl, methoxy, ethoxy, propoxy, isopropoxy, butoxy, hexyloxy, dodecyloxy, 2-ethylhexyloxy, and halogen such as bromine or preferable chlorine.

Examples of the radicals $R_1$ and $R_2$ in formula (I) are methyl, ethyl, propyl, butyl, iso-butyl, amyl, 2,2-dimethylpropyl, octyl, dodecyl, vinyl, allyl, dimethylvinyl and 8-heptadecenyl. Alkyl radicals containing not more than 4 carbon atoms are preferred.

The aforenamed saturated alkyl radicals are also examples of suitable radicals $Z_1$, $Z_2$ and $Z_3$. These latter may however have further meanings, for example iso-propyl, tert. butyl, 2,6,8-trimethyl-4-nonyl, 2-ethylhexyl, 2,4,6,8-tetramethylnonyl, cyclopentyl, cyclohexyl, 2-cyclohexylethyl, 4-methylcyclohexyl, 2,5-, 2,6-, 3,4- and 3,5-dimethylcycloheyl, cycloheptyl, cyclododecyl, phenyl, 2-, 3- and 4-methylphenyl, dimethylphenyl (a mixture of isomers), para-tert. butylphenyl, 2-methoxyphenyl, 3-chlorophenyl and dichlorophenyl (a mixture of isomers).

Examples of the instances in which the radicals $Z_2$ and $Z_3$ are conjoined and form with the N atom a heterocyclic ring are enumerated in Table 1 below.

TABLE 1

Heterocyclic ring formed by linkage of $Z_2$ and $Z_3$ in the radical

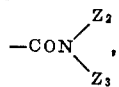

| | Corresponding formula of radical Y |
|---|---|
| Pyrrolidino | —CON⬠ |
| Piperidino | —CON⬡ |
| Hexamethylenimino | —CON⬡ |
| Morpholino | —CON⬡O |

It is of advantage to select the radicals $Z_1$, $Z_2$ and $Z_3$ so that the total number of carbon atoms in these radicals, in the radicals $R_1$ and $R_2$ and in any substituents present on Q does not amount to more than 20.

The starting compounds of the general formula (II) are known or can be synthesized by analogy with known methods. The synthesis starts with diphenyl sulphides, dibenzothiophenes or dibenzofurans which are either unsubstituted or substituted in a benzene ring by halogen atoms and/or alkyl or alkoxy radicals. They are reacted with halides or anhydrides of saturated or unsaturated carboxylic acids in accordance with the Friedel-Crafts method.

The compounds of the general formula (III) are derivatives of cyanacetic acid such as cyanacetonitrile malononitrile), cyanacetic esters and cyanacetamides, which are easy of access.

The production process outlined above is in essentials an aldol condensation in which a ketone reacts with an activated methylene group with splitting off of water. Because of the constitution of the starting materials, the reaction is termed the "Knoevenagel condensation." The original condensation method of Knoevenagel or one of the modifications of later date can be employed, such as that of Doebner. In the present case the Cope modification has been found especially useful. The reaction conditions are fully described in the literature, cf. for example:

E. Knoevenagel, Ber. *31*, 2596 (1898)
O. Doebner, Ber. *33*, 2140 (1900)
J. R. Johnson in Organic Reactions I, pp. 226, 233 (New York, 1942)
L. F. Fieser and M. Fieser, Organic Chemistry, 3rd ed., p. 692 (New York, 1956)
H. B. Watson, Ann. Rep. on Progress in Chem., Chem. Soc. (London) *36*, 210 (1939)
U.S. Pat. No. 2,623,060
Baliak, Ganapathy, J. Indian Chem. Soc. *32*, 333–8 (1955)

A. C. Cope, J. Am. Chem. Soc. 59, 2327–30 (1937)
Cuong Luu Duc, J. Alary und A. Boucherle, Chemie Thérapeutique 4, 271–275 (1969).

The present invention relates further to the use of the new cyanacrylic acid derivatives of formula (I) as ultraviolet absorbers. For this purpose they can either be incorporated in materials or products sensitive to ultra-violet radiation or applied to the surface to form a protective film. By absorbing the deleterious ultra-violet rays the compounds protect sensitive substances from degradation.

The disclosed compounds can be incorporated, for instance, in suntan creams and lotions to absorb the short-wave ultra-violet rays which cause erythema. Their possible uses in plastics technology are however more numerous than in medicine and cosmetics. Here they are applicable in a wide range of materials, including cellulose acetate, cellulose acetobutyrate, polyethylene, polypropylene, polyvinyl chloride, polyvinyl chloride acetate, polyamides, polystyrene, ethyl cellulose, cellulose nitrate, polyvinyl alcohol, silicon rubber, cellulose propionate, melamine-formaldehyde resins, urea-formaldehyde resins, allyl casting resins, polymethylmethacrylate, polyesters and polyacrylonitrile. Natural products also, such as rubber, cellulose, wool and silk, can be protected from ultraviolet radiation with the compounds of formula (I).

The products of product materials which are to be protected may be present in solid forms such as film, sheet, tape, rod, panels, fibres, granules or powders, as solutions, emulsions or dispersions, or in other processing forms. The ultra-violet absorbers of formula (I) are incorporated in or applied to these substances by known methods. One important technique of application is intimate mixing of the absorber with a plastics material, for instance polypropylene granules, in a kneading machine, followed by extrusion. In this way homogeneous blending is achieved, which is important for effective protection. The material may be extruded in various forms, for example as film, tubing, or as filament for weaving into textile fabric. As stated, in this technique the ultra-violet absorber is blended with the polypropylene prior to its processing in textile form. Alternatively it can be applied to the formed filament or fabric from superfine dispersion in water. This technique is suitable for applying the compounds of formula (I) to textiles of polyethylene terephthalate and cellulose acetate fibres.

Plastics need not necessarily be present in the form of the final polymer before the new stabilizing compounds are incorporated in them. The latter can be added to the monomers, prepolymers or precondensates prior to the condensation or other polymerization reaction. Certain members of the group of stabilizers of general formula (I) are of a nature which enables them to form a chemical linkage with the polymer during its transformation into the final state. This is so with the compounds of formula (I) in which $R_1$ and/or $R_2$ represent alkenyl, when added to reaction melts for the synthesis of polyacrylonitrile, polymethylmethacrylate, polystyrene or polypropylene. Another example of the chemical combination of an ultra-violet absorber of the disclosed type with the polymer is that of a compound of formula (I) in which Y represents the radical —COOZ, with a polyester precondensate consisting of maleic anhydride, phthalic anhydride and ethylene glycol in the molecular ratio of 3:7:10. Subsequent condensation polymerization in the presence of transesterification catalysts yields a polyester resin containing the condensed compound of formula (I).

In addition to their use for the stabilization of clear films, plastic products and the like, the new ultra-violet absorbers can be incorporated in opaque, semi-opaque and translucent plastic products having a surface which is subject to attack by ulra-violet radiation. Examples of such products are foamed plastics, opaque film and sheeting, opaque papers, transparent and opaque pigmented plastics, fluorescing pigments, automobile and furniture polishes, creams, lotions and the like, which may be transparent, translucent or opaque.

The compounds of formula (I) are especially suitable for protecting high molecular weight formaldehyde polymers. It is preferable to incorporate the selected absorber in the reaction melt at a point prior to transformation into the final polymer. Other stabilizers such as the benzotriazoles and benzophenones cannot be applied in this way as they cause depolymerization.

The ultra-violet absorbers of formula (I) can be employed in conjunction with other absorbers of light or with stabilizers. Such mixtures of active substances often have a synergetic effect and protect the treated product from ultra-violet radiation and from the action of heat and oxidative degradation.

It is not necessary to incorporate the new compounds in or apply them to the material in order to obtain protection from ultra-violet radiation. Foods such as butter, fruit and cooking oils, for example, can be protected by packaging in plastic film or sheet containing a compound of formula (I).

The present invention relates further to the products and product materials which have been protected against ultra-violet radiation by the incorporation or application of a compound of formula (I). As indicated by the few examples of application outlined above, the new compounds can be incorporated in the materials or products at any stage of manufacture by means of the known methods. The amount of incorporated or applied ultra-violet absorber may vary within wide limits, e.g. from 0.01 to 5%, or preferably 0.05 to 1%, in relation to the weight of the material to be protected.

In the following Examples m.p. stands for melting point, b.p. for boiling point and λ for wavelength. The parts and percentages are by weight and the temperatures in degrees centigrade.

Examples of compounds of formula (I) are specified in Tables 2 and 3 below. The melting points of the crystalline compounds, which are considerably higher than room temerature, are listed in the column headed m.p.; the other compounds are termed oils in this column. The constitutional formulae given here have been verified by elementary analysis.

TABLE 2

Examples of compounds of formula (I) in which $m$ represents 1

| Ex. No. | Q | $R_1$ | Y | M.P., °C. | B.P., °C. | $\lambda_{max}$, nm. |
|---|---|---|---|---|---|---|
| 1 | (dibenzofuran) | $CH_3$ | —CN | 132–134 | | 320 |
| 2 | Same as above | $CH_3$ | —COOC$_2$H$_5$ | 152–154 | | 200 |
| 3 | do | $CH_3$ | —COOC$_8$H$_{17}$ | 114–117 | | 300 |
| 4 | do | $CH_3$ | —CON(phenyl) | | 915 | 291 |

TABLE 2—Continued

| Ex. No. | Q | $R_1$ | Y | M.P., °C. | B.P., °C. | $\lambda_{max.}$, nm. |
|---|---|---|---|---|---|---|
| 5 | H₅C₂-[dibenzofuran] | $CH_3$ | $-CN$ | 94–96 | | 325 |
| 6 | Same as above | $CH_3$ | $-COOC_2H_5$ | Oil | 210 0.4 | 298 |
| 7 | H₁₇C₈-[dibenzofuran] | $CH_3$ | $-CN$ | Oil | | 325 |
| 8 | [dibenzofuran] | $C_2H_5$ | $-CN$ | 144–146 | | 320 |
| 9 | Same as above | $C_2H_5$ | $-COOC_2H_5$ | 120–122 | | 291 |
| 10 | do | $C_3H_7$ | $-CN$ | 144–146 | | 320 |
| 11 | do | $C_7H_{15}$ | $-CN$ | Oil | 230 0.02 | 322 |
| 12 | [dibenzothiophene] | $CH_3$ | $-CN$ | 144–146 | | 350 |
| 13 | Same as above | $CH_3$ | $-COOC_2H_5$ | 193–195 | | 330 |
| 14 | do | $CH_3$ | $-COOC_8H_{17}$ | 104–106 | | 340 |
| 15 | [dibenzothiophene] | $CH_3$ | $-COOCH_2-CH-C_4H_9$<br>$\quad\quad\quad\quad\quad C_2H_5$ | Oil | | 305 |
| 16 | Same as above | $CH_3$ | $\quad\quad\quad CH_3$<br>$-COOCH_2-C-CH_2CHCH_3$<br>$\quad\quad\quad CH_3\quad CH_3$ | Oil | | 302 |
| 17 | do | $CH_3$ | $-COOCH_2-C_6H_5$ | 155–157 | | 306 |
| 18 | do | $CH_3$ | $-CON\bigcirc O$ | 171–173 | | 294 |
| 19 | do | $C_3H_7$ | $-CN$ | 104–106 | | 345 |
| 20 | do | $C_7H_{15}$ | $-COOC_2H_5$ | Oil | 260 0.001 | 322 |
| 21 | [phenyl-S-phenyl] | $CH_3$ | $-CN$ | 61–63 | | 350 |
| 22 | Same as above | $CH_3$ | $-COOC_2H_5$ | Oil | | 335 |
| 23 | do | $CH_3$ | $-CON\bigcirc O$ | 113–115 | | 318 |
| 24 | do | $CH_3$ | $-COOC_8H_{17}$ | Oil | | 335 |
| 25 | [dibenzothiophene] | $-CH=CH$<br>$\quad\quad CH_3$ | $-COOCH_2-CH-C_4H_9$<br>$\quad\quad\quad\quad\quad C_2H_5$ | Oil | | 325 |

TABLE 3
Examples of compounds of formula (I) in which $m$ represents 2

| Ex. No. | Q | $R_1$ | $R_2$ | Y | M.P., °C. | B.P., °C. | $\lambda_{max.}$, nm. |
|---|---|---|---|---|---|---|---|
| 26 | [dibenzofuran] | $CH_3$ | $CH_3$ | $-CN$ | 281–283 | | 320 |
| 27 | [dibenzothiophene] | $CH_3$ | $CH_3$ | $-COOC_8H_{17}$ | Oil | | 320 |
| 28 | [phenyl-S-phenyl] | $C_2H_5$ | $C_2H_5$ | $-CN$ | 168–169 | | 350 |
| 29 | Same as above | $C_2H_5$ | $C_2H_5$ | $-COOC_2H_5$ | Oil | | 325 |
| 30 | do | $C_2H_5$ | $C_2H_5$ | $-COOC_8H_{17}$ | Oil | | 325 |
| 31 | do | $C_7H_{15}$ | $C_7H_{15}$ | $-CN$ | 59–61 | | 350 |

Examples of the production of compounds of formula (I).—The numbering of these examples agrees with that of the compounds listed in Tables 2 and 3.

EXAMPLE 3 (TABLE 2)

In a reaction vessel fitted with a stirrer, water separator and reflux condenser a solution of 105.1 parts of 3-acetyl-dibenzofuran, 109.5 parts of cyanacetic-n-octylester, 24 parts of glacial acetic acid and 6 parts of ammonium acetate in 500 parts of toluene is raised to the boil. Before long, the starting-point of the condensation reaction is reached, as can be recognized from the turbidity of the toluene flowing back from the reflux condenser which is caused by water drops. After 4 to 5 hours there is a marked decrease in dehydration. A further 2 parts of ammonium acetate are added and stirring is continued with reflux until splitting off of water is complete. The entire reaction takes about 20 hours. The pale yellow solution is allowed to cool, neutralized by washing with water, and concentrated by evaporation. The oily residue is mixed with 250 parts of methanol, on which the crude product settles out. It is filtered and purified by crystallization from alcohol.

EXAMPLE 21 (TABLE 2)

In a reaction vessel equipped with stirrer, water separator and reflux condenser, 114 parts of 4-acetyl diphenyl-sulphide, 36.3 parts of malononitrile, 24 parts of glacial acetic acid and 8 parts of ammonium acetate in 500 parts of benzene are heated to boiling temperature. The Knoevenagel reaction soons sets in and can be detected by the turbidity of the benzene flowing back from the reflux condenser which is due to water drops. The water split off in the reaction is conducted off along with the benzene vapour and separated in the water separator, the condensed benzene then flowing back into the vessel. After 3 to 4 hours there is a marked falling-off in dehydration. A further 1.5 parts of ammonium acetate are added and stirring is continued with reflux until no more water is split off. The reaction takes about 12 hours to complete. The pale yellow solution is allowed to cool, washed with water for neutralization, and concentrated by evaporation. The residue consists of a new, crude compound having the formula given in Example 21 of Table 2. It can be obtained in analytically pure form by recrystallization from methanol.

EXAMPLE 26 (TABLE 3)

The batch for reaction consists of 10 parts of 3,6-diacetyl-dibenzofuran, 6.6 parts of malononitrile, 4.8 parts of glacial acetic acid and 0.8 parts of ammonium acetate in 90 parts of benzene, and is set for reaction in a vessel fitted with stirrer, water separator and reflux condenser. Shortly after heating to boiling temperature the Knoevenagel reaction begins and can be recognized from the turbidity of the benzene returned from the condenser, which is due to the presence of water drops. The water split off in the reaction and the benzene vapour are led off and separated in the water separator, the condensed benzene then flowing back into the vessel. After 3 to 4 hours there is a sharp drop in dehydration, on which 0.8 parts of ammonium acetate are added and stirring with reflux continued until splitting off of water is complete. The reaction as a whole takes about 12 hours. On cooling, the crude reaction product settles out in crystalline form. It can be purified by recrystallization from dioxan.

In an analogous manner 3-propionyldibenzofuran can be reacted with malononitrile and 3-acetyldibenzothio-phene with cyanacetic ethylester (cf. Table 2, Examples 8 and 13 respectively). In these reactions the product does not settle out from the medium on cooling. The benzolic reaction mixture has to be neutralized by washing with water and concentrated by evaporation to isolate the crude product, which can then be purified by recrystallization from methanol.

EXAMPLES FOR THE APPLICATION

Example A

Polypropylene moulding material and 0.2% of the compound of Example 3 (Table 2) are homogeneously mixed at 180° by the normal method. Panels of 0.3 mm. thickness are injection moulded with this polypropylene and with identical polypropylene without an incorporated additive of this type. The panels are tested for weathering resistance by the De La Rue method at 40° and 75% relative atmospheric humidity, with intense renewal of air and radiation by 16 sunlamps and 16 blacklamps of Philips manufacture. After exposure for 250 hours the polypropylene panels without a protective additive show hair cracks and embrittlement, whereas those containing the compound of this invention are unaffected by the test.

Example B

Two lots of polyvinyl chloride, one containing 0.2% of the compound described in Example 12 (Table 2), the other without such an additive, are injection moulded as panels as in Example A. The panels are submitted to the aforedescribed weathering test for 500 hours, after which time the former panels are unchanged whereas the latter without the protective additive are brown and brittle.

Example C

Tests analogous to those described in Example A show that polypropylene is protected against the action of radiation when 0.2–0.5% of one of the compounds described in Examples 14 or 22 is incorporated in the moulding material.

Example D

When the compound of Example 2 (Table 2), Example 21 (Table 2) or Example 28 (Table 3) is used in place of that of Example 12 and the test described in Example B is carried out, comparable results are obtained.

Example E

A lacquer of the following composition:

|  | Percent |
|---|---|
| Cellulose acetobutyrate | 18.00 |
| Dibutyl phthalate | 2.00 |
| Butyl acetate | 20.70 |
| Xylene | 33.40 |
| Methyl iso-butyl ketone | 8.35 |
| Cyclohexanone | 8.35 |
| n-butanol | 9.20 | is applied to a bleached maplewood veneer. On exposure to light the lacquer film yellows rapidly. When 0.2% of the compound described in Example 21 (Table 2), 0.6% of that of Example 12 (Table 2) or 0.6% of that of Example 28 (Table 3) is mixed with a lacquer of the given composition, the yellowing of the lacquer film on the veneer is very considerably retarded.

Formulae of representative stabilizers of the foregoing Examples are as folows:

Example 4

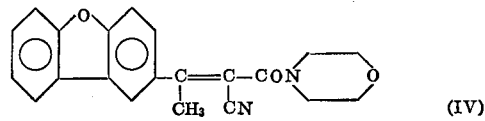

(IV)

Example 7

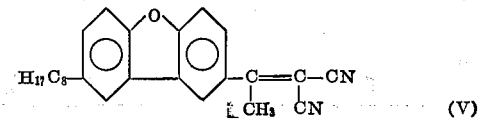

(V)

Example 25

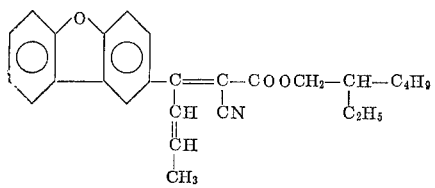

(VI)

Example 27

$$H_{17}C_8OOC-C=C-\underset{\underset{CH_3}{|}}{\overset{S}{\bigcirc\bigcirc}}-C=C-COOC_8H_{17}$$
$$\phantom{H_{17}C_8OOC-}\underset{CN}{|}\phantom{-}\underset{CH_3}{|}\phantom{XXXXXX}\underset{CH_3}{|}\phantom{-}\underset{CN}{|}$$

(VII)

Example 31

$$NC-C=C-\underset{\underset{C_7H_{15}}{|}}{\bigcirc}-S-\bigcirc-C=C-CN$$
$$\phantom{NC-}\underset{CN}{|}\phantom{XX}\phantom{XXXXXXX}\underset{H_{15}C_7}{|}\phantom{-}\underset{CN}{|}$$

(VIII)

Having disclosed the invention, what is claimed is:

1. A compound of the formula $$\left(Y-\underset{\underset{CN}{|}}{C}=\underset{\underset{R_2}{|}}{C}-\right)_{m-1} Q - \underset{\underset{R_1}{|}}{C}=\underset{\underset{CN}{|}}{C} - Y$$

where
Q is diphenylene sulphide or diphenylene oxide and, when $m$ represents the number 1, may be substituted not more than twice by halogen and/or alkyl or alkoxy,
$R_1$ and $R_2$, independently of each other, are alkyl or alkenyl,
Y is —CN, —COO$Z_1$ or $$-CO-N\underset{Z_3}{\overset{Z_2}{\diagdown}},$$

$Z_1$ is alkyl, cycloalkyl or phenyl and may be substituted by lower alkyl, lower alkoxy, chloro, or phenyl,
$Z_2$ and $Z_3$ conjointly and together with the N atom stand for pyrrolidino, piperidino, hexamethyleneimino or morpholino or, independently of each other, stand for hydrogen or one of the groups named in the definition of $Z_1$, and $m$ is 1 or 2,
the total number of carbon atoms in $Z_1$, $Z_2$, $Z_3$, $R_1$, $R_2$ and any substituent on Q being no more than 20.

2. A compound according to Claim 1 having the formula $$\left(Y-\underset{\underset{CN}{|}}{C}=\underset{\underset{R_2}{|}}{C}\right)_{m-1} \overset{O}{\bigcirc\bigcirc} - \underset{\underset{R_1}{|}}{C}=\underset{\underset{CN}{|}}{C}-Y$$

3. A compound according to Claim 1 having the formula $$\left(Y-\underset{\underset{CN}{|}}{C}=\underset{\underset{R_2}{|}}{C}\right)_{m-1} \overset{S}{\bigcirc\bigcirc} - \underset{\underset{R_1}{|}}{C}=\underset{\underset{CN}{|}}{C}-Y$$

4. A compound according to Claim 1 wherein $R_1$ and $R_2$ are alkyl.

5. A compound according to Claim 1 wherein $R_1$ and $R_2$ are alkyl of 1 to 4 carbon atoms.

6. A compound according to claim 1 of formula $$Y_1-\underset{\underset{CN}{|}}{C}=\underset{\underset{R_4}{|}}{C}-Q_1-\underset{\underset{R_3}{|}}{C}=\underset{\underset{CN}{|}}{C}-Y_1$$

where
$Q_1$ is a diphenylene sulphide or diphenylene oxide radical,
$Y_1$ is —CN or —COO—$R_4$ and
$R_3$ and $R_4$ independently of each other are alkyl radicals.

7. The compound according to claim 2 of formula $$\overset{O}{\bigcirc\bigcirc}-\underset{\underset{CH_3}{|}}{C}=\underset{\underset{CN}{|}}{C}-COOC_8H_{17}$$

8. The compound according to claim 3 of formula $$\overset{S}{\bigcirc\bigcirc}-\underset{\underset{CH_3}{|}}{C}=\underset{\underset{CN}{|}}{C}-COOC_8H_{17}$$

9. The compound according to claim 2 of formula $$NC-\underset{\underset{CN}{|}}{C}=\underset{\underset{CH_3}{|}}{C}-\overset{O}{\bigcirc\bigcirc}-\underset{\underset{CH_3}{|}}{C}=\underset{\underset{CN}{|}}{C}-CN$$

References Cited
UNITED STATES PATENTS

| | | | |
|---|---|---|---|
| 3,270,045 | 8/1966 | Strobel et al. | 260—465 H |
| 3,275,520 | 9/1966 | Strobel et al. | 260—465 H |
| 3,336,357 | 8/1967 | Strobel et al. | 260—465 H |
| 3,405,137 | 10/1968 | Csapilla | 260—346.2 M |
| 3,530,075 | 9/1970 | Wiebe | 260—329.3 |
| 3,576,003 | 4/1971 | Strobel et al. | 260—329.2 |
| 3,576,005 | 4/1971 | Strobel et al. | 260—329.2 |
| 3,578,683 | 5/1971 | Loy et al. | 260—329.3 |

NORMA S. MILESTONE, Primary Examiner

R. T. BOND, Assistant Examiner

U.S. Cl. X.R.

260—346.2 M, 465 D, 465 E, 465 H, 293.57, 293.58, 247.1 L, 247.7 A, 326.5 CA, 239 R; 252—300